United States Patent
Koike

(10) Patent No.: US 7,200,472 B2
(45) Date of Patent: Apr. 3, 2007

(54) CONTROL DEVICE AND METHOD FOR FUEL CELL POWERED VEHICLE

(75) Inventor: Yuichi Koike, Yokosuka (JP)

(73) Assignee: Nissan Motor Co., Ltd., Yokohama-shi (JP)

( * ) Notice: Subject to any disclaimer, the term of this patent is extended or adjusted under 35 U.S.C. 154(b) by 165 days.

(21) Appl. No.: 11/071,734

(22) Filed: Mar. 4, 2005

(65) Prior Publication Data

US 2005/0197751 A1 Sep. 8, 2005

(30) Foreign Application Priority Data

Mar. 8, 2004 (JP) ............................. 2004-064383

(51) Int. Cl.
*B60L 11/18* (2006.01)
*H01M 8/00* (2006.01)
*H02J 7/00* (2006.01)

(52) U.S. Cl. ...................................... 701/22; 180/65.3

(58) Field of Classification Search ................ None
See application file for complete search history.

(56) References Cited

U.S. PATENT DOCUMENTS

| 5,780,981 A * | 7/1998 | Sonntag et al. ............. 318/139 |
| 6,452,352 B1 * | 9/2002 | Farkas ........................ 318/433 |
| 2002/0138183 A1 * | 9/2002 | Keilhofer et al. .............. 701/22 |
| 2002/0162694 A1 * | 11/2002 | Iwasaki ....................... 180/65.3 |
| 2002/0175010 A1 * | 11/2002 | Kobayashi et al. ........ 180/65.3 |
| 2003/0094816 A1 * | 5/2003 | Kazama ..................... 290/40 C |
| 2004/0234825 A1 * | 11/2004 | Numao et al. ................... 429/9 |

FOREIGN PATENT DOCUMENTS

| JP | 2002-352826 A | 12/2002 |
| JP | 2002-352833 A | 12/2002 |

* cited by examiner

*Primary Examiner*—Michael J. Zanelli
(74) *Attorney, Agent, or Firm*—Foley & Lardner LLP

(57) ABSTRACT

A system controller 100 controlling an electric power generation system of a fuel cell powered vehicle realizes functions as a fuel-cell power-generation response time estimation section 101, by which power-generation response time of a fuel cell 1 is estimated, an optimum motor-output response time estimation section 102, by which an optimum output response time of a drive motor 22 is estimated, and a motor-output response time control section 103 for controlling an output response time of the drive motor 22. The power-generation response time of the fuel cell is estimated based on an atmospheric pressure detected by an atmospheric sensor 35 and depending on this power-generation response time, the output response time of the drive motor is controlled so as to limit a rate of change in a torque command value for the drive motor such that the output response time of the drive motor is not shorter than power-generation response time of the fuel cell.

11 Claims, 9 Drawing Sheets

CONTROL DEVICE AND METHOD FOR FUEL CELL POWERED VEHICLE

BACKGROUND OF THE INVENTION

The present invention relates to control devices and methods for controlling an electric power supply system of a fuel cell powered vehicle and, more particularly, to a control device and method for a fuel cell powered vehicle that alleviates a sense of discomfort in acceleration feelings encountered during a drop in an air density such as in traveling in high altitudes.

As countermeasures to address environmental issues in recent years, particularly, global warming issues resulting from air pollutions and carbon dioxide emissions due to automotive exhaust gases, fuel cell technologies have been focused on because these technologies enable clean emissions and the realization of high-energy efficiencies. Therefore, at the present days, there have been increasing efforts in research and development work related to fuel cell powered vehicles on which such a fuel cell is installed as a main power supply.

In cases where the fuel cell powered vehicles travels in high altitudes and then an air density drops, difficulties are encountered in supplying reaction gas (oxidizer gas) at a desired pressure and flow rate and electric power generated by a fuel cell becomes unstable causing an electric current to be extracted with electric power being generated under a shortage of reaction gas to be supplied, resulting in issues of performance degradation of the fuel cell.

Therefore, Japanese Patent Applications No. 2002-352826 and No. 2002-352833 propose control technologies, for a fuel cell operating under circumstances with a drop in an air density such as traveling in high altitudes, in which an atmospheric pressure is detected and the rotational speed of a compressor is corrected so as to obtain oxidizer gas at a desired flow rate for a demanded electric power output whereupon the fuel cell is operated to generate electric power.

SUMMARY OF THE INVENTION

However, with the related art technologies described above, since the rotational speed of the compressor is corrected to supply oxidizer gas to the fuel cell at the desired flow rate to realize electric power generation at a demanded rate under circumstances, such as when running in the high altitudes, where a drop occurs in an air density, a compressor torque is forced to increase due to an increase in the rotational speed of the compressor and an increase in a pressure ratio of the compressor, resulting in an increase in workload requirements of the compressor. Accordingly, if a drop occurs in the atmospheric pressure, power-generation response time of the fuel cell requires a longer period of time On the other hand, a torque command value for a drive motor of the fuel cell powered vehicle is fundamentally calculated in consideration of the power-generation response time of the fuel cell such that the drive motor has a power-consumption response time depending on a vehicle speed (the rotational speed of the drive motor). However, in cases where a drop occurs in the atmospheric pressure to cause an increase in the power-generation response time of the fuel cell requires, if a torque command is delivered to the drive motor without estimating the power-generation response time of the fuel cell, an output of the drive motor is restricted with electric power (i.e., a sum of fuel cell power output supplied to a vehicle and electric power discharged by battery) available to be supplied to the drive motor, resulting in issues for a driver to encounter a sense of discomfort in acceleration feelings.

That is, the torque command value for the drive motor is fundamentally designed to have a value, which does not make a torque request in excess, in consideration of the power-generation response time of the fuel cell at one atmosphere. Therefore, if the air density decreases followed by a drop in the atmospheric pressure to cause an increase in the power-generation response time of the fuel cell, it is assumed that a target power consumption of the drive motor, required from the torque command value of the drive motor, exceeds a drive-motor supply power actually available to be supplied to the drive motor, causing an output of the drive motor to be rapidly restricted. Such a condition constitutes a factor by which acceleration feelings are remarkably impaired.

The present invention has been completed with the related art circumstances set forth above and has an object to provide a control device and method for a fuel cell powered vehicle that is able to alleviate a sense of discomfort in acceleration feelings even under situations where a longer period of time is required in an power-generation response time of a fuel cell due to a drop in an air density such as when traveling in high altitudes.

To achieve the above object, one aspect of the present invention provides a control device for an electric power supply system of a fuel cell powered vehicle, driven by a drive motor, which is installed with a fuel cell as a main power supply, comprising fuel-cell power-generation response time estimating section by which a power-generation response time of the fuel cell is estimated, and drive-motor output response-time control section by which an output response time of the drive motor is controlled depending on an estimated result of the fuel-cell power-generating response-time estimating section.

Another aspect of the present invention provides a method of controlling an electric power supply system of a fuel cell powered vehicle, driven by a drive motor, which is installed with a fuel cell as a main power supply, comprising estimating a power-generation response time of the fuel cell, and controlling an output response time of the drive motor depending on an estimated result of the estimating.

BRIEF DESCRIPTION OF THE DRAWINGS

FIGS. 5A and 5B are views for illustrating a method of estimating a power-generation response time of a fuel cell, with FIG. 5A showing a characteristic view illustrating the relationship between the atmospheric pressure and a compressor rotational speed, by which a target gross power is achieved, while FIG. 5B shows a characteristic view illustrating the relationship between the compressor rotational speed and net power generated by the fuel cell.

DETAILED DESCRIPTION OF THE PREFERRED EMBODIMENT

Hereinafter, reference will be made to a concrete embodiment according to the present invention which is illustrated in the accompanying drawings.

Figure 1:
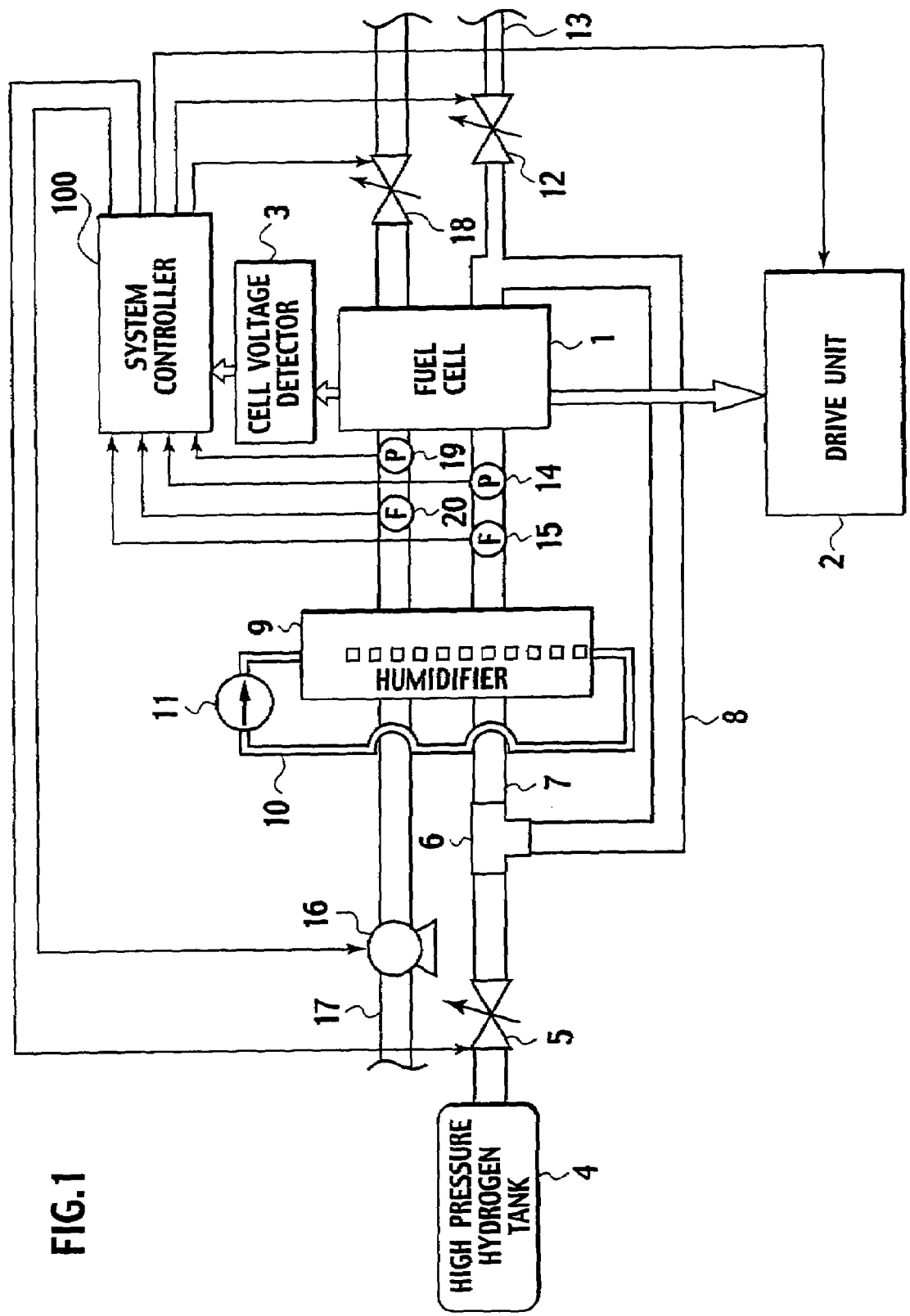
FIG. 1 is a view showing one structural example of a fuel cell power generation system.

First, referring to FIG. 1, description is made of one concrete example of a fuel cell and a fuel cell power generation system to be installed on a fuel cell powered vehicle as a main power supply.

First Embodiment

The fuel cell power generation system is generally comprised of a fuel cell 1, a fuel supply line by which hydrogen (or hydrogen rich gas), forming fuel, is supplied to the fuel cell 1, and an air supply line by which oxidizer (air) is supplied, and electric power resulting from electric power generation of the fuel cell 1 is supplied to a drive unit 2 of the fuel cell powered vehicle.

The fuel cell 1 takes the form of a structure composed of stacks of multiple stages of electric power generating cells each of which has a fuel electrode, supplied with hydrogen, and an air electrode, supplied with oxygen (air), between which an electrolyte/electrode/catalyst composite body is sandwiched, with chemical energy resulting from electrochemical reaction being converted to electric energy. Supplying hydrogen to the fuel electrode of each electric power-generating cell allows hydrogen ions and electrons to be dissociated. The hydrogen ions permeate through the electrolyte while the electrons pass through an external circuit to generate electric power, whereupon these components move to the air electrode, respectively. Also, on the air electrode, reaction occurs between oxygen, contained in air, and electrons which are supplied, resulting in the formation of water that is discharged to the outside of the system.

As for the electrolyte of the fuel cell 1, a solid polymer electrolyte is employed in consideration of the provision of a high energy density, a low cost and a lightweight structure. The solid polymer electrolyte is formed of an ion (proton) conductive high polymer such as an ion-exchange membrane made of fluorocarbon resin and, upon saturated with water, serves as an ion conductive electrolyte membrane.

Connected to the fuel cell 1 is a cell voltage detector 3, which detects a voltage of each electric power-generating cell or a voltage of an electric power-generating cell group, and an output of the cell voltage detector 3 is inputted to a system controller 100. The system controller 100 incorporates therein control software based on which a whole of the electric power generation system, to which the present invention is applied, is controlled.

The fuel supply line is comprised of a high-pressure hydrogen tank 4, a variable valve 5, an ejector 6, a hydrogen supply conduit 7 and a hydrogen circulation conduit 8. Supplied from the high-pressure hydrogen tank 4, serving as a hydrogen supply source, is hydrogen gas, which is delivered to the hydrogen supply conduit 7 via the variable valve 5 and the ejector 6, and then humidified in a humidifier 9 whereupon it is supplied to the fuel electrode of the fuel cell 1. Mounted to the humidifier 9 are a humidifying pure water path 10 and a pure water pump 11, and a rate of humidifying hydrogen gas is controlled depending on a flow rate of pure water and temperatures.

Most of hydrogen gas supplied to the fuel cell 1 is not entirely consumed and residual hydrogen gas (hydrogen gas expelled from the fuel cell 1), which is circulated via the ejector 6 for mixing with incoming fresh hydrogen gas, is supplied to the fuel electrode of the fuel cell 1 again. Also, connected to an outlet of an anode electrode of the fuel cell 1 are a purge valve 12 and a purge conduit 13. The presence of hydrogen circulated through the hydrogen circulation conduit 8 causes the accumulation of impurities or nitrogen therein, resulting in probabilities with a drop in hydrogen partial pressure to cause a reduction in efficiency of the fuel cell 1. Therefore, the provision of the purge valve 12 and the purge conduit 13 connected to the outlet of the fuel cell 1 enables the impurities and nitrogen to be removed from the hydrogen circulation conduit 8.

Further, disposed on the fuel supply line in a halfway area thereof are a hydrogen pressure sensor 14 and a hydrogen flow rate sensor 15 by which a pressure and a flow rate of hydrogen, being supplied to the fuel electrode of the fuel cell 1, are detected, respectively.

The air supply line is comprised of a compressor 16 through which air is drawn, an air supply conduit 17 and a throttle valve 18. Air, supplied from the compressor 16 as oxidizer, passes through the humidifier 9, like hydrogen gas, and supplied to the air electrode of the fuel cell 1 via the air supply conduit 17.

Also disposed in the air supply line in a halfway area thereof are an air pressure sensor 19 and an air flow rate sensor 20 by which a pressure and a flow rate of air, being supplied to the air electrode of the fuel cell 1, are detected, respectively.

With the fuel cell system power generation system with such a structure described above, outputs of the air pressure sensor 19 for detecting an air pressure at an inlet of the air electrode of the fuel cell 1, the air flow rate sensor 20 for detecting the air flow rate, the hydrogen pressure sensor 14 for detecting a hydrogen pressure, the hydrogen flow rate sensor 15 for detecting the hydrogen flow rate and the cell voltage detector 3 are monitored by the system controller 100. The system controller 100 controllably operates the compressor 16, the throttle valve 18 and the variable valve 5 such that detected values, resulting from respective detector means, lie at respective given target values determined based on a target gross power generated at a given time. Concurrently, the system controller 100 commands the fuel cell 1 to deliver a power output (current value) to the drive unit 2 depending on the pressure and the flow rate actually realized for the target value.

Figure 2:
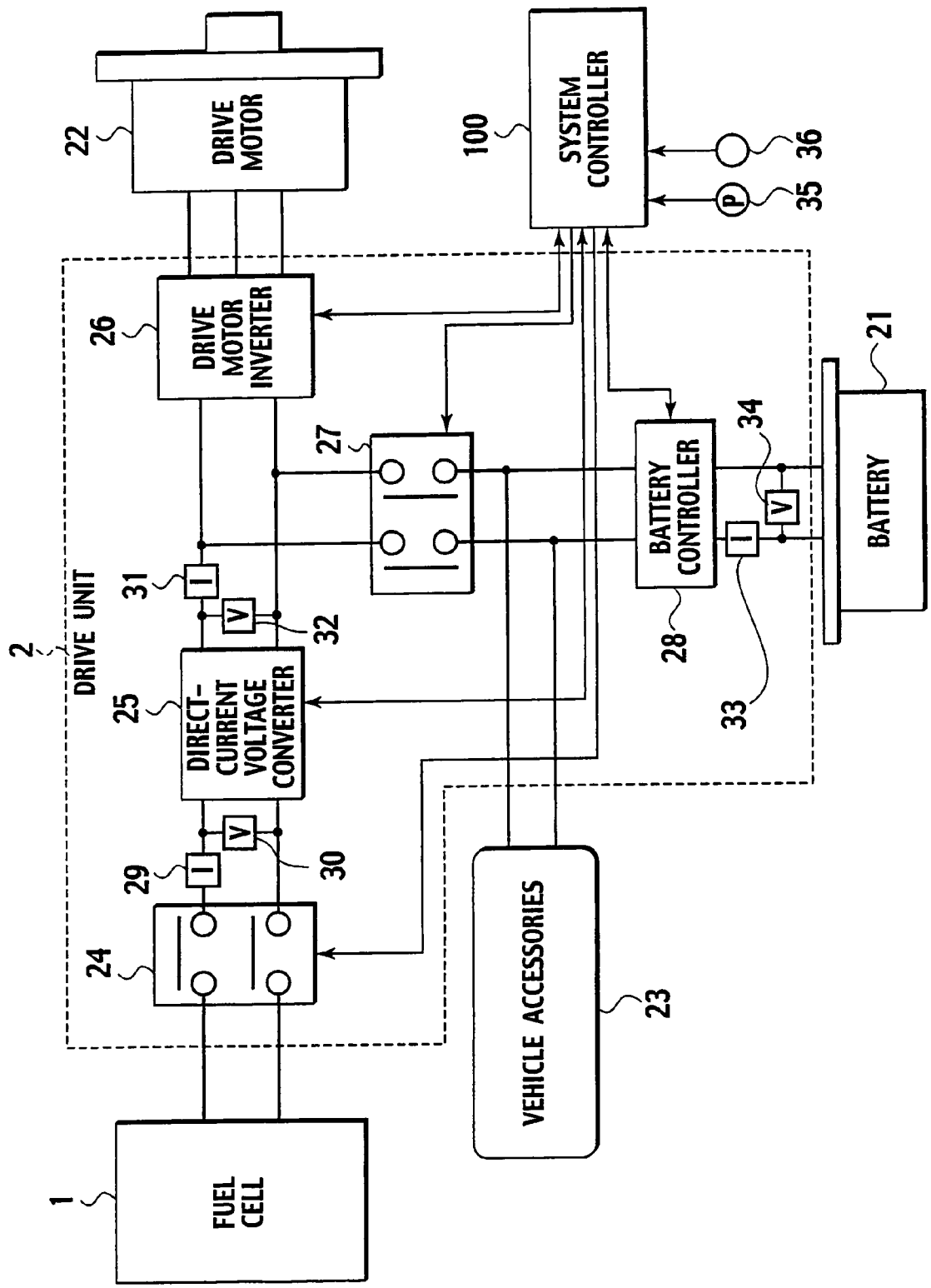
FIG. 2 is a view showing an overall structure of an electric power supply system for a fuel cell powered vehicle.

Now, referring to FIG. 2, description is made of an overall structure of an electric power supply system of a fuel cell powered vehicle employing the fuel cell power generation system with such a structure set forth above.

The electric power generation system serves to control the delivery of electric power generated by the fuel cell 1, serving as a main power supply, and the delivery of electric power discharged from a battery 21, serving as an auxiliary power supply, and supply electric power, extracted from the fuel cell 1 and the battery 21, to a drive motor 22 and other vehicle accessories 23. The electric power generation system has one part that is unitized as the drive unit 2. Also, connected to the drive unit 2 are the system controller 100 set forth above, the fuel cell 1 serving as the main power supply, the battery 21 serving as the auxiliary power supply, the drive motor 22 and the other accessories 23.

Incorporated in the drive unit 2 are a fuel cell main relay 24, a direct-current voltage converter 25, a motor inverter 26, a battery main relay 27 and a battery controller 28.

The fuel cell main relay 24 is disposed in a fuel cell and load circuit, to which the fuel cell 1 and the load, such as the drive motor 22, are connected, and controllably turned on or turned off by the system controller 100. If the fuel cell main relay 24 is turned on, the fuel cell and load circuit is made conductive and if the fuel cell main relay 24 is turned off, the fuel cell and load circuit is shut off.

The direct-current voltage converter 25 serves to convert electric power, generated by the fuel cell 1, into a direct current to be outputted to associate component parts. Connected to a front stage (on a side closer to the fuel cell 1) of the direct-current voltage converter 25 are a current sensor 29 and a voltage sensor 30 by which an input current and an input voltage of the direct-current voltage converter 25 are detected, respectively. Also, connected to a rear stage (on a side closer to the drive motor 22) of the direct-current voltage converter 25 are a current sensor 31 and a voltage sensor 32 by which an output current and an output voltage of the direct-current voltage converter 25 are detected, respectively.

The motor inverter 26 serves to regulate electric power, to be supplied to the drive motor 22, depending on commands delivered from the system controller 100 for controlling the rotational speed and torque of the drive motor 26 to respective given values.

The battery main relay 27 is disposed in a battery and load circuit to which the battery 21 and the drive motor 22 are connected and controllably turned on or turned off by the system controller 100. If the battery main relay 24 is turned on, the battery and load circuit is made conductive and if the battery main relay 24 is turned off, the battery and load circuit is shut off.

The battery controller 28 monitors a status of the battery 21 and supplies related information to the system controller 100 while controlling the delivery of electric power from the battery 21 in response to a command from the system controller 100. Connected between the battery controller 28 and the battery 21 are a current sensor 33 and a voltage sensor 34 for detecting an output current and an output voltage of the battery 21, respectively.

Further, connected to the system controller 100 are an atmospheric sensor 35 for detecting an atmospheric pressure and an accelerator-opening sensor 36 by which an accelerator opening degree is detected.

With the fuel cell system with such a structure set forth above, the system controller 100 suitably reads in detection signals, delivered from the respective current sensors 29, 31, 33, the voltage sensors 30, 32, 34, the atmospheric sensor 35 and the accelerator-opening sensor 36, and information related to the direct-current voltage converter 25, the motor inverter 26 and the battery controller 100 for controlling the operation of the overall electric power supply system based on built-in control software. In addition, particularly in the presently filed embodiment, the system controller 100 controls electric power being supplied to the drive motor 22 such that during a drop in the atmospheric pressure, an output response time of the drive motor 22 is controlled.

Now, a detailed sequence of operations for control to be executed by the system controller 100 set forth above is concretely described with a focus on characteristic portions of the presently filed embodiment.

Figure 3:
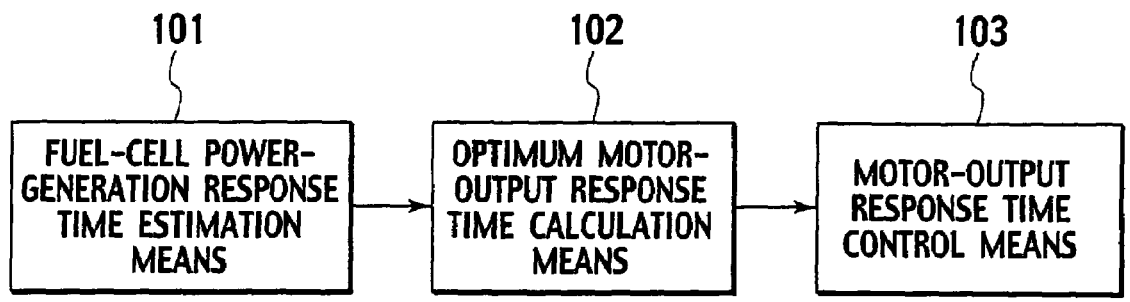
FIG. 3 is a functional block diagram showing respective means to be realized in a system controller.

The system controller 100 executes built-in control software to realize functions of a fuel-cell power-generation response time estimating means 101, serving as a fuel-cell power-generation response time estimating section, that estimates a power-generation response time of the fuel cell 1, an optimum motor-output response-time calculation means 102, serving as an optimum motor-output response-time calculating section, that computes an optimum motor-output response time based on an estimated result of the fuel-cell power-generation response time estimating means 101, and a motor-output response control means 103, serving as a drive-motor output response-time control section, that controls an output response time of the drive motor 22 based on a computed result of the optimum motor-output response-time calculation means 102, respectively, as shown by a functional block diagram in FIG. 3. Then, the system controller 100 estimates the power-generation response time of the fuel cell 1, based on the atmospheric pressure detected by the atmospheric sensor 35, to calculate a torque command value to be applied to the drive motor 22, based on the resulting power-generation response time, such that the output response time of the drive motor 22 exceeds the power-generation response time of the fuel cell 1 whereupon the torque command value is delivered to the motor inverter 26 for controlling the drive motor 22.

Figure 4:
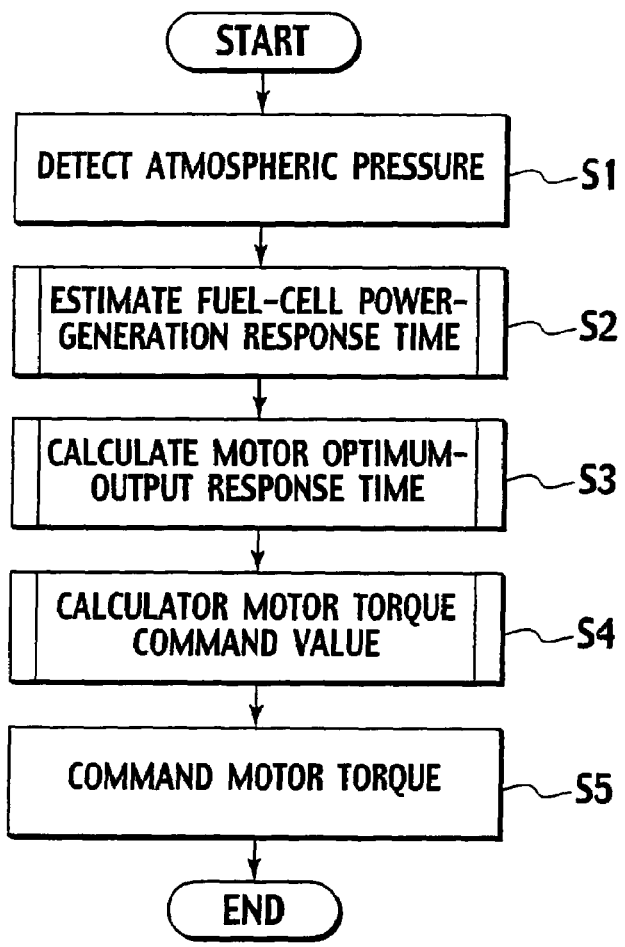
FIG. 4 is a flowchart showing a general outline of a basic sequence of operations of performing drive control for a drive motor to be executed by the system controller.

FIG. 4 is a flowchart illustrating one example of control flow to be executed for every given time (of 10 msec) by the system controller 100 set forth above.

As the present control flow starts, first in step S1, the system controller 100 reads in the detected value of the atmospheric pressure sensor 35 to detect the atmospheric pressure and, in step S2, estimates the power-generation response time of the fuel cell 1 (serving as the fuel-cell power-generation response time estimating section 101) based on the atmospheric pressure detected in step S1. Then, in step S3, the system controller 100 calculates the optimum-output response time of the drive motor 22 (serving as the optimum motor-output response-time calculation section 102). In next step S4, a torque command value for the drive motor 22 is calculated based on the optimum-output response time of the drive motor 22 resulting from calculation in step S3. In consecutive step S5, transmitting the torque command value for the drive motor 22, resulting from the calculation in step S4, to the motor inverter 26 allows the drive motor 22 to be controlled (serving as a motor-output response control section 103).

Figure 5A:
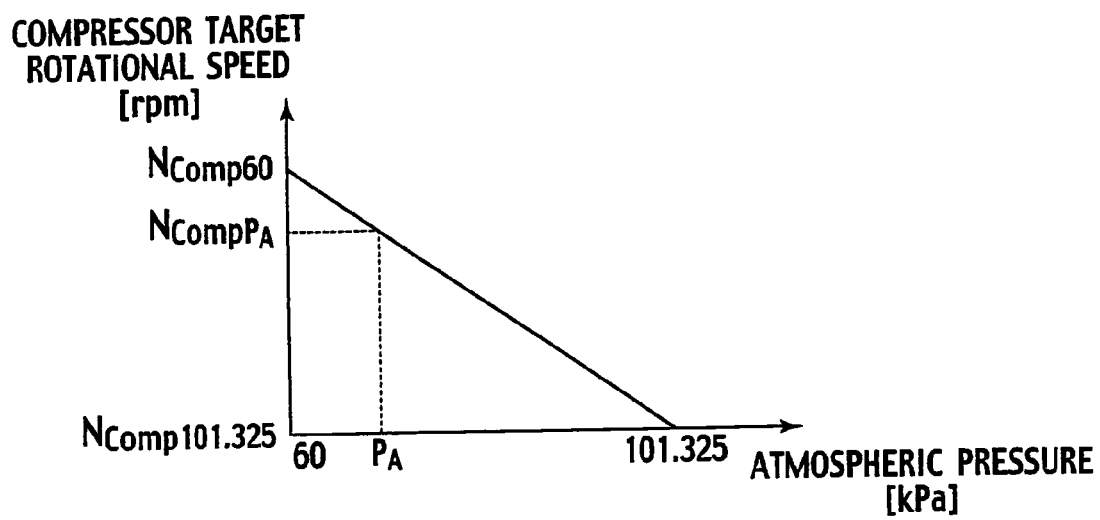
Figure 5B:
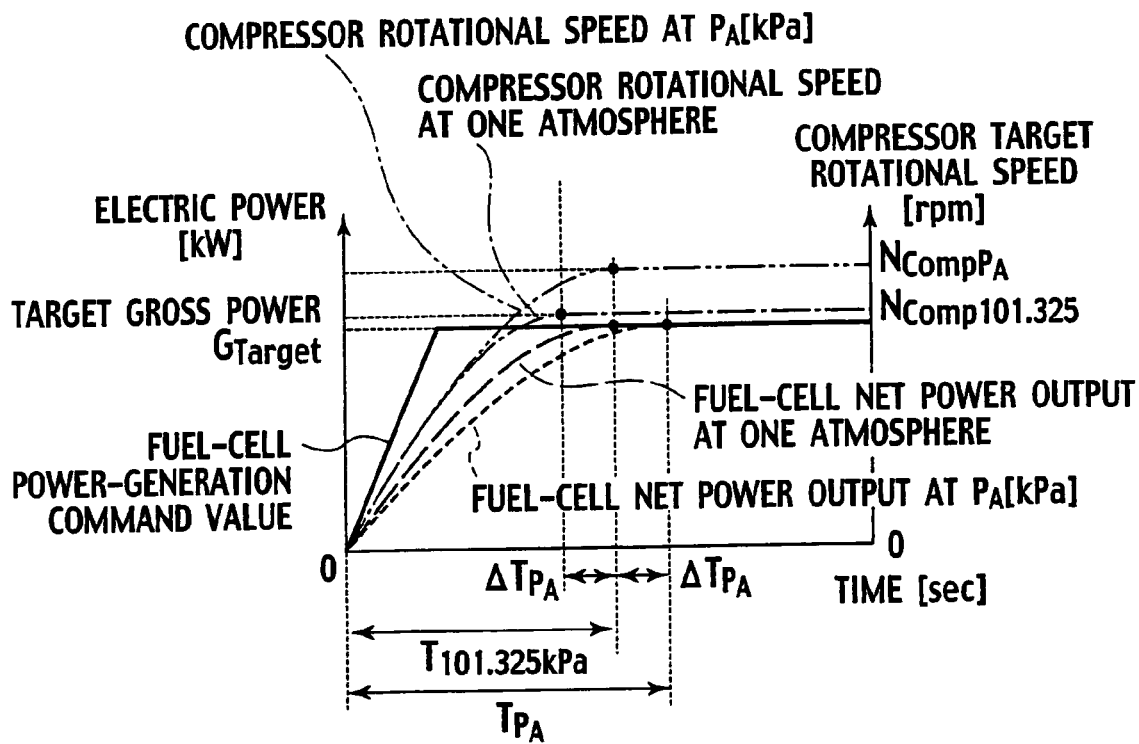

Next, reference is made to FIGS. 5A and 5B to describe a method of estimating the power-generation response time of the fuel cell 1 in step S2.

FIG. 5A shows the relationship between a target rotational speed of the compressor 16, which realizes the generation of a target gross power of the fuel cell 1, and the atmospheric pressure. It will be appreciated from FIG. 5A that as the atmospheric pressure decreases, the target rotational speed of the compressor 16 gradually increases for realizing the generation of the target gross power of the fuel cell 1. Also, in FIG. 5A, reference "$N_{comp101.325}$" [rpm] designates a target rotational speed of the compressor 16 for realizing a flow rate of air required for supply to the fuel cell 1 at one atmosphere (101.325 kPa); "$N_{comp60}$" [rpm] designates a target rotational speed of the compressor 16 for realizing a flow rate of air required to be supplied to the fuel cell at an atmospheric pressure of 60 (kPa); and "$N_{compPA}$" [rpm] designates a target rotational speed of the compressor 16 for realizing a flow rate of air required for supply to the fuel cell 1 at an atmospheric pressure of $P_A$ (kPa). Here, the inequality $N_{comp101.325} < N_{compPA} < N_{comp60}$ is satisfied.

FIG. 5B shows the relationships between a rotational speed of the compressor 16 and a net power generated by the fuel cell 1 in contrast to cases where the atmospheric pressure remains at one atmosphere and at an atmospheric pressure of $P_A$ [kPa]. Suppose from FIG. 5B that a rate of change in the power-output command value for the fuel cell 1 is constant, a rate of change in a rotational speed command value for the compressor 16 is also constant. Therefore, if a target rotational-speed achievement time of the compressor 16 is delayed by a value of $\Delta T_{PA}$ followed by a drop in the atmospheric pressure, the power-generation response time (a response time in which the net power generated by the fuel cell 1 reaches a target gross power of $G_{Target}$) of the fuel cell 1 is also delayed by a value corresponding to the value of $\Delta T_{PA}$ and, when the atmospheric pressure lies at $P_A$ [kpa], the power-generation response time of the fuel cell 1 lies at a value of $T_{PA}$ [sec].

As set forth above, due to the presence of a change in the power-generation response time of the fuel cell 1 in accordance with the atmospheric pressure, the system controller 100 of the presently fled embodiment contemplates to estimate the power-generation response time of the fuel cell 1 depending on the detected atmospheric pressure. Also, another alternative may be conceived in which a method of estimating the power-generation response time of the fuel cell 1 includes a step of estimating the power-generation response time of the fuel cell 1 based on a rate of change in torque of a motor by which the compressor 16 is driven.

Figure 6:
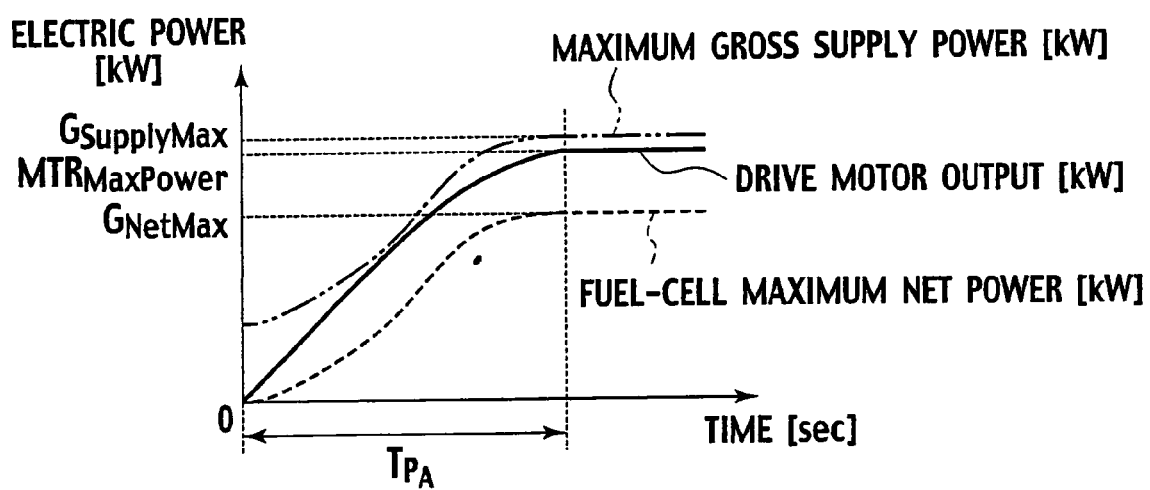
FIG. 6 is a view for illustrating a method of calculating an optimum-output response time of the drive motor.

Next, reference is made to FIG. 6 to describe a method of calculating the optimum-output response time of the drive motor 22 in step S3. FIG. 6 refers to an exemplary case wherein the fuel cell 1 generates the maximum net power $G_{NetMax}$ [kW] to cause the drive motor 22 to provide an output at the maximum power $MTR_{Maxpower}$ [kW] and shows the relationship between a power-generating response of the duel cell 1 and an output response of the drive motor 22 in such a case. Also, FIG. 6 shows a response capability of the fuel cell 1 available to supply the maximum gross supply power $G_{SupplyMax}$ [kW] to the drive motor 22. Here, the maximum gross supply power $G_{SupplyMax}$ [kW], available to be supplied to the drive motor 22, corresponds to a value in which auxiliary-accessory power consumption, consumed by the vehicle accessories 23, is subtracted from a sum of the maximum net power $G_{NetMax}$ [kW] generated by the fuel cell 1 and the maximum power discharged by the battery 21 and a related response time is equal to the power-generation response time of the fuel cell 1.

As shown in FIG. 6, with the presently filed embodiment, the output response time of the drive motor 22 is aligned on the power-generation response time of the fuel cell 1. That is, since when the atmospheric pressure lies at $P_A$ [kPa], the power-generation response time of the fuel cell 1 lies at $T_{PA}$ [sec], the optimum-output response time of the drive motor 22 also lies at $T_{PA}$ [sec]. Also, details of a concrete content of this operation will be described below.

Next, description is made of a method of calculating a torque command value for the drive motor 22 in step S4.

Supposing that, in a case where the output time is made equal to an optimum-output response time, the output (see FIG. 6) of the drive motor 22 is described as $MTR_{Power}$ [kW]; a power loss (drive-motor power loss) of the drive motor 22 $MTR_{PowerLoss}$ [kW]; and a rotational speed of the drive motor 22 $N_{MTR}$ [rpm], then a torque $T_{MTR}$ [Nm] of the drive motor 22 can be represented by Eq. (1) with the resulting value corresponding to the torque command value for the drive motor 22:

$$T_{MTR} = \frac{60(MTR_{Power} - MTR_{PowerLoss})}{2\pi N_{MTR}} \text{ [Nm]}. \tag{1}$$

However, the output characteristic of the drive motor 22 is preliminarily restricted such that the maximum power of the drive motor 22 becomes less than the maximum gross supply power $G_{SupplyMax}$ [kW] available to be supplied to the drive motor 22.

With the presently filed embodiment, the presence of the system controller 100 that repeatedly executes the control flow, set forth above, for a given cycle enables the drive motor 22 to be properly controlled and driven even in the presence of a delay in the power-generation response time of the fuel cell 1 due to a drop in an atmospheric pressure during traveling in high altitudes, thereby alleviating a sense of discomfort in acceleration feelings.

Figure 7:
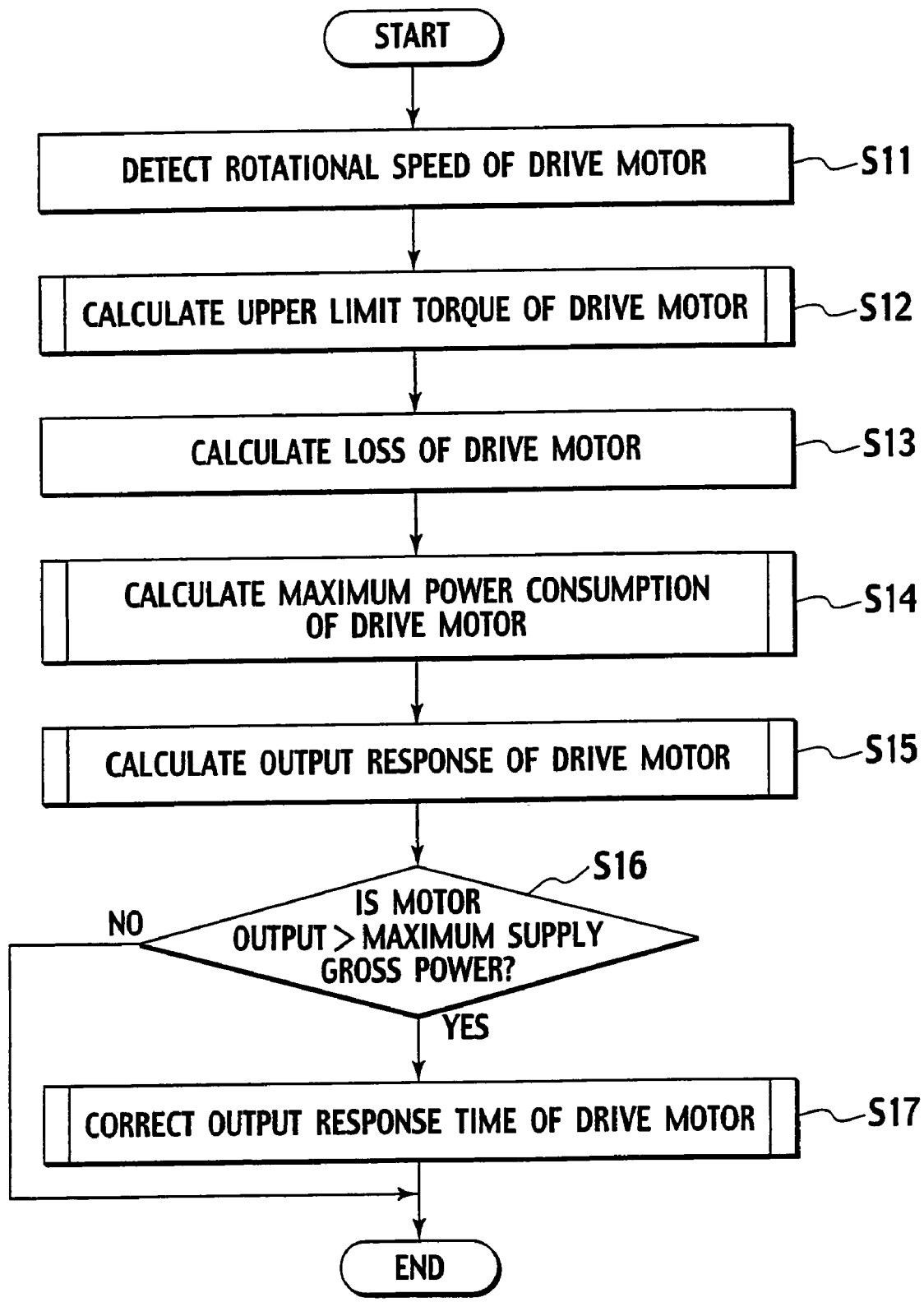
FIG. 7 is a flowchart illustrating a detailed sequence of operations of calculating the optimum-output response time of the drive motor.

Now, the operations of step S3 in the control flow set forth above, that is, details of operations of calculating an optimum-output response time of the drive motor 22 are described below in detail with reference to a flowchart of FIG. 7.

Figure 8:
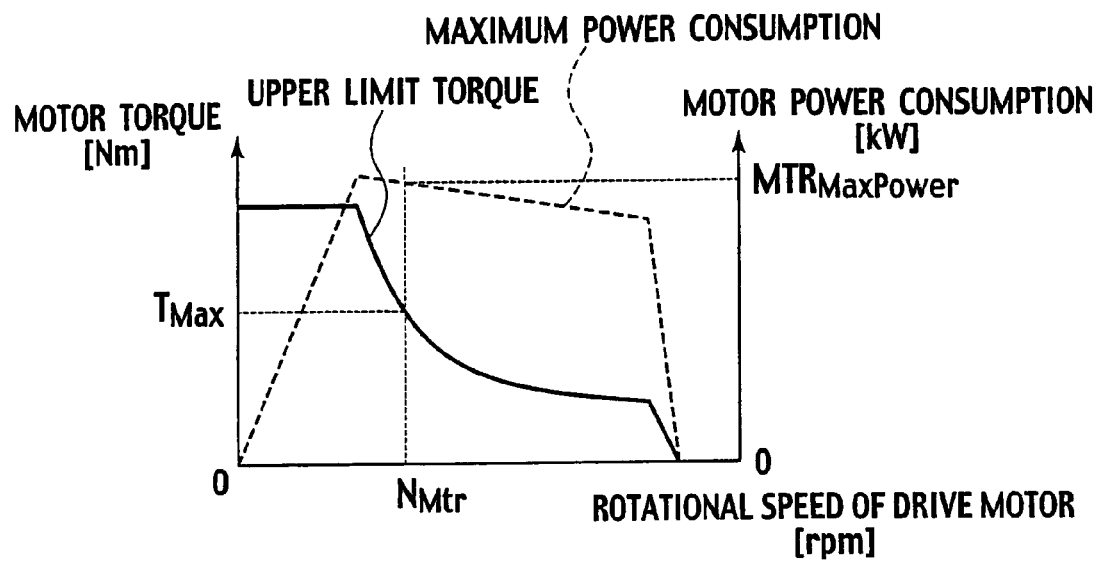
FIG. 8 is a characteristic view showing the relationship among the rotational speed of the drive motor, an upper limit value of the drive motor and the maximum power consumption of the drive motor.

When calculating the optimum-output response time of the drive motor 22, first in step S11, the system controller 100 reads information delivered from the motor inverter 26 for detection of the rotational speed of the drive motor 22. Then, in step S12, an upper limit torque of the drive motor 22 is calculated based on the rotational speed of the drive motor 22. Thus, step S12 serves as a drive-motor upper-limit torque calculation device. Also, the relationship between the rotational speed and the torque of the drive motor 22 is determined in terms of standards of the drive motor 22 as shown in FIG. 8.

In next step S13, a power loss of the drive motor 22 is calculated based on the rotational speed of the drive motor 22, calculated in step S11, and the upper limit torque of the drive motor, calculated in step S12, in terms of the relationship between the rotational speed and torque of the drive motor 22, obtained upon preliminary experimental tests, and the power loss of the drive motor 22. Thus, step S13 serves as a drive-motor power-loss estimation device. In consecutive step S14, the maximum power consumption of the drive motor 22 for each given vehicle speed, that is, the maximum power consumption corresponding to a particular rotational speed of the drive motor 22, are calculated based on the rotational speed of the drive motor 22 calculated in step S11, the upper limit torque of the drive motor 22 calculated in step S12, and the power loss of the drive motor 22 calculated in step S13. Thus, step S14 serves as a drive-motor maximum power consumption calculation device. The relationship between the rotational speed and the maximum power consumption of the drive motor 22 is collectively shown in FIG. 8.

Figure 9:
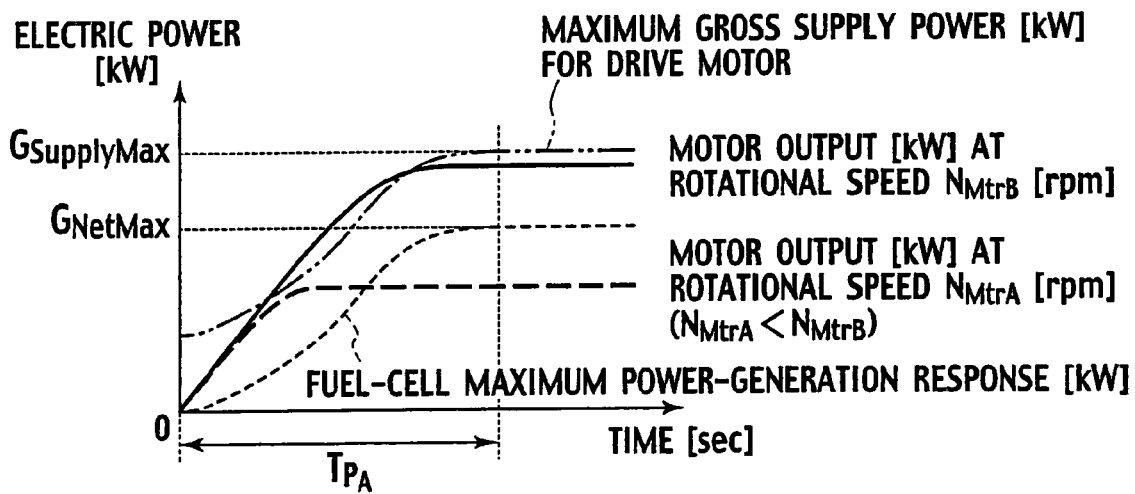
FIG. 9 is a view illustrating output responses in terms of a difference in the rotational speed of the drive motor in contrast with respect to one another.

In succeeding step S15, the calculation is executed to obtain the output response of the drive motor 22 based on the maximum power consumption associated with the rotational speed of the drive motor 22, calculated in step S14, under situations where the output of the drive motor 22 is varied to the maximum power consumption at a given rate of change in the output o the drive motor 22. Thus, step S15 serves as a drive-motor output response estimation device. Here, the output response of the drive motor 22 results in a difference depending on the rotational speed of the drive motor 22. Also, FIG. 9 shows the relationship between an output response of the drive motor 22 with given rotational speeds of $N_{MtrA}$ [rpm] and $N_{MtrB}$ [rpm], where the inequality $N_{MtrA} < N_{MtrB}$ is satisfied, and a power-generating response of the fuel cell 1 with the atmospheric pressure of $P_A$ [kPa] under circumstances where upon preliminary experimental tests to obtain an upper limit value of a rate of change in the output of the drive motor 22, the drive motor is driven with such an upper limit value of the rate of change in the output of the drive motor 22. However, it will be appreciated that the upper limit value of the rate of change in the output of the drive motor 22 is calculated based on a power-generating response of the fuel cell 1 with an atmospheric pressure equivalent to one atmosphere, an electric power available to be supplied to the drive motor 22, and a vehicle drivability.

Therefore, in step S16, upon comparison between the output response of the drive motor 22, at the given rotational speed calculated in step S15, and the response of the fuel cell 1 with the maximum gross supply power of $G_{SupplyMax}$ [kW] available to be supplied to the drive motor 22, discrimination is made at a certain timing whether the output of the drive motor 22 exceeds the power output available to be supplied to the drive motor 22.

Figure 10:
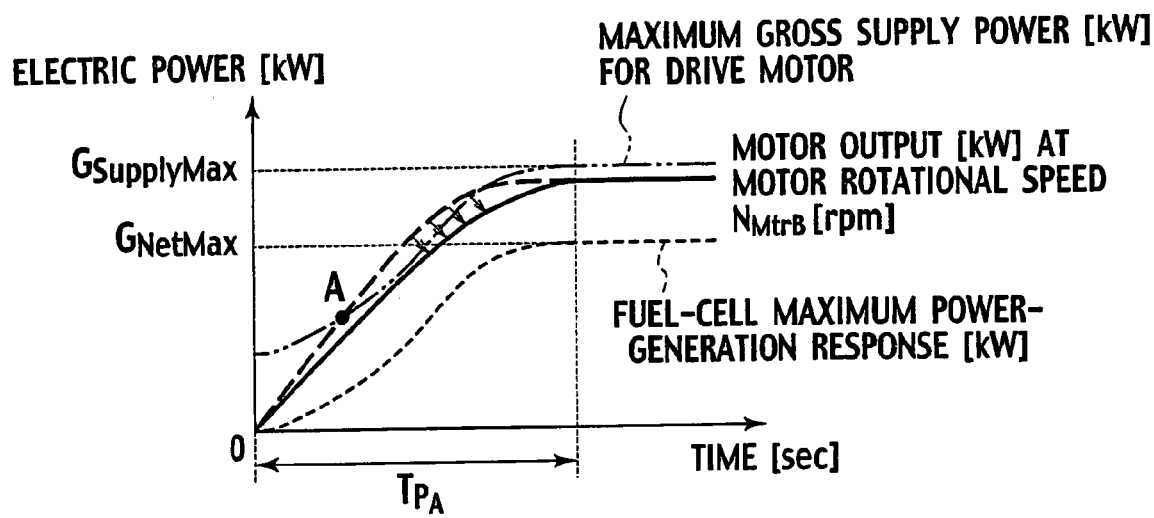
FIG. 10 is a view illustrating how an output response of the drive motor is corrected.

As a result of discrimination in step S16, if it is supposed that the output of the drive motor 22 exceeds the power output available to be supplied to the drive motor 22, then in step S17, the output response time of the drive motor 22 is corrected such that the output of the drive motor 22 does not exceed the power output available to be supplied to the drive motor 22. That is, in an example shown in FIG. 10, the output of the drive motor 22 with the rotational speed of $N_{MtrB}$ [rpm] crosses a point A in the drawing figure and exceeds the power output available to be supplied to the drive motor 22. In such a case, decreasing a rate of change in a torque command value, for each cycle, to be applied to the drive motor 22 allows the correction such that the output response time of the drive motor 22 substantially is equal to the power-generation response time $T_{PA}$ [sec] of the fuel cell 1. This minimizes a sense of discomfort in acceleration feelings caused by the occurrence of the output of the drive motor 22 exceeding the power output available to be supplied to the drive motor 22.

Also, while the presently filed embodiment has been described on the premise that the battery 21 is installed on the fuel cell powered vehicle as the auxiliary power supply to allow the drive motor 22 to be supplied with the power outputs both from the fuel cell 1 and the battery 21, similar control may be possibly executed under circumstances where no battery 221 is installed on the fuel cell powered vehicle while only the electric power, generated by the fuel cell 1, is supplied to the drive motor 22.

In cases where the battery 21 is installed on the fuel cell powered vehicle, the maximum gross supply power, set forth above, available to be supplied to the drive motor 22 can be obtained by subtracting the electric power, consumed by the vehicle accessories 23, from a sum of the electric power, generated by the fuel cell 1, and the maximum power output discharged from the battery 21. On the contrary, with no battery 21 installed, the maximum gross supply power, set forth above, available to be supplied to the drive motor 22 may take a value obtained by subtracting the electric power consumed by the vehicle accessories 23 from the power output generated by the fuel cell 1. Also, the maximum power output to be discharged from the battery 21 can be obtained by permitting the system controller 100 to execute the calculating operation based on information delivered from the battery controller 28. Thus, the system controller 100 serves as a battery maximum-discharging-power calculating section. In addition, the electric power consumed by the vehicle accessories 23 can be estimated based on the output current of the battery detected by the current sensor 33 and the battery voltage detected by the voltage sensor 34.

Moreover, when estimating the electric power consumed by the vehicle accessories 23, the system controller 100 may preferably estimate the electric power consumed by the vehicle accessories 23 within a range in which an estimated value of the electric power consumed by the vehicle accessories 23 does not exceed the above-described upper limit value. In particular, upon conducting preliminary experiments to investigate the relationship associated with the maximum value of a power consumption of vehicle accessories under circumstances where a drop occurs in an atmospheric pressure, an upper limit value of the power consumption of the vehicle accessories associated with the atmospheric pressure, that is, an upper limit value of the power consumption of the vehicle accessories associated with the power-generating response of the duel cell 1, are determined based on the atmospheric pressure detected by the atmospheric pressure sensor 35, upon which the power consumption of the vehicle accessories 23 is estimated up to a ceiling of such an upper limit value. This makes it possible for the power consumption of the vehicle accessories 23 to be appropriately estimated even if it increases due to a drop in the atmospheric pressure.

As set forth above, with the presently filed embodiment, since the system controller 100, which controls the electric power supply system of the fuel cell powered vehicle, estimates the power-generating response of the fuel cell 1 based on which the output response time of the drive motor 22 is controlled, the drive control of the drive motor 22 can be appropriately performed without causing probabilities to occur wherein the output of the drive motor 22 is rapidly restricted by the supply power available to be supplied to the drive motor 22 at this moment while minimizing a sense of discomfort in acceleration feelings resulting from the rapid restriction in the output of the drive motor 22. Also, since the system controller 100 estimates the power-generating response of the fuel cell 1 based on the atmospheric pressure detected by the atmospheric pressure sensor 35, the power-generating response of the fuel cell 1 can be estimated at a high precision, thereby enabling the optimum control of the output response time of the drive motor 22.

Further, with the presently filed embodiment, under circumstances where it is preliminarily apparent that upon detection of the vehicle speed (the rotational speed of the drive motor), the maximum power consumption of the drive motor 22 is calculated and the maximum power consumption of the drive motor 22 is small whereby the output of the drive motor 22 can be covered with the electric power available to be supplied to the drive motor 22, the operation is executed not to restrict the rate of change in the torque command value for the drive motor 22. It is thus possible to control the output response time of the drive motor 22 only when needed without restricting the output of the drive motor 22, thereby alleviating a sense of discomfort in acceleration feelings for a driver.

In the meantime, the system controller 100 of the presently filed embodiment, which controls the electric power supply system of the fuel cell powered vehicle, not only has a function to control the output response time of the drive motor 22 in a manner as set forth above but also has a function (to serve as a request-power change-rate limiting means) to control a rate of change in a request power demanded to the fuel cell 1. Hereunder, reference is made to FIGS. 11 to 13 for describing a method of controlling the rate of change in the request power to be executed by the system controller 100.

Figure 11:
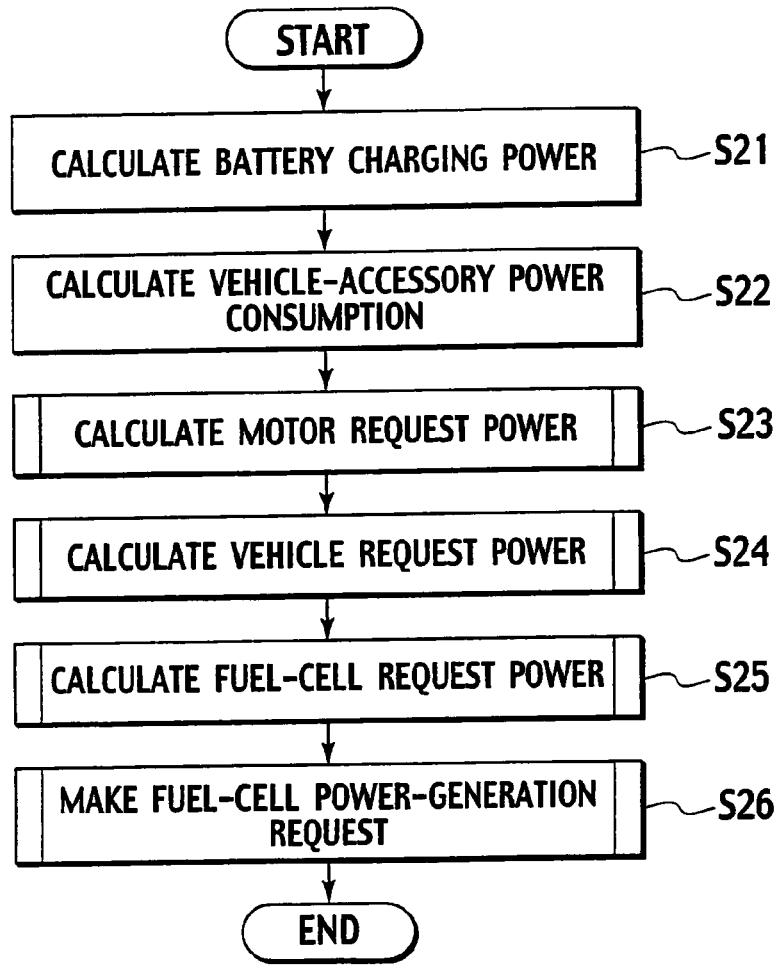
FIG. 11 is a flowchart illustrating a general outline of a basic sequence of operations to be executed by the system controller for making a power generation request to the fuel cell.

FIG. 11 is a flowchart illustrating one example of control flow to be executed for making a power-generation request to the fuel cell 1.

As present control flow starts, first in step S21, the system controller 100 calculates an electric power to be charged to the battery 21 based on information from the battery controller 28. In succeeding step S22, a power consumption of the vehicle accessories 23 is calculated on the procedure set forth above and, in step S23, the operation is executed to calculate a motor request power demanded by the drive motor 22. Thus, step S22 serves as a vehicle-accessory power-consumption estimation device. In consecutive step S24, adding the battery charging power, calculated in step S21, the vehicle-accessory power consumption, calculated in step S22, and the motor request power, calculated in step S23, allows the calculation of a vehicle request power demanded for a whole of the fuel cell-powered vehicle. In next step S25, of the vehicle request power, an electric power to be covered by the fuel cell 1 is calculated as a fuel-cell request power. In consecutive step S26, the power-generation request is made to the fuel cell 1 based on the fuel-cell request power calculated in step S25.

Figure 12:
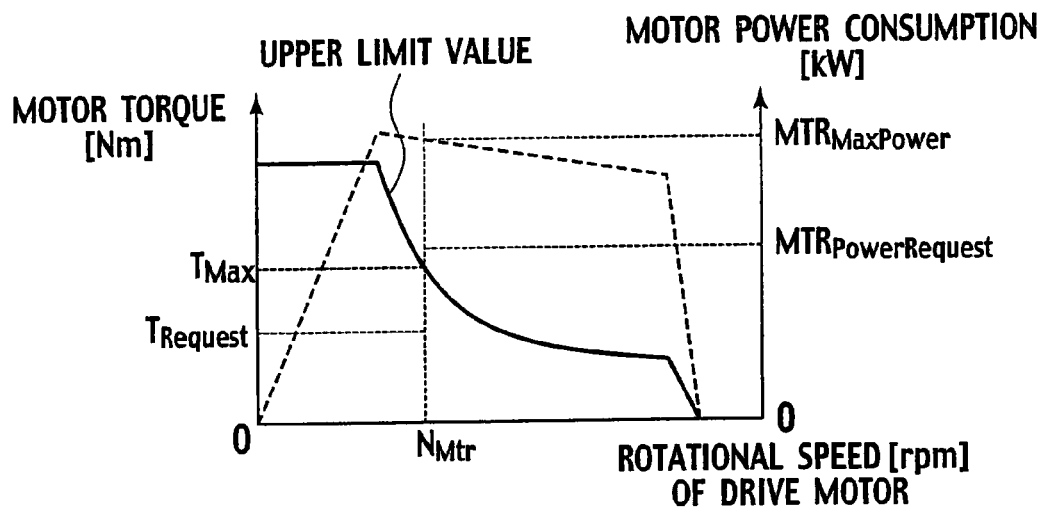
FIG. 12 is a view for illustrating a method of calculating a demanded power of the drive motor.

Now, description is made of a method of calculating the motor request power in step S23 with reference to FIG. 12.

When the rotational speed of the drive motor 22 lies at $N_{Mtr}$ [rpm], an upper limit torque of the drive motor 22 takes a value of $T_{Max}$ [Nm] in FIG. 12. Then, a request torque $T_{Request}$ [Nm] actually demanded for the drive motor 22 is determined from Eq. (2) in accordance with an accelerator-depressing increment of APO [%] (which is expressed as APO=100 when an accelerator pedal is fully depressed) effectuated by a driver:

$$T_{Request} = T_{Max} \times \frac{APO}{100} \text{ [Nm]}. \tag{2}$$

Also, the acceleration-opening sensor 36 detects the accelerator-depressing increment caused by the driver.

Further, supposing that a power loss of the drive motor 22 in such a moment is described as $MTR_{PowerLossR}$ [kW], a motor request power $MTR_{PowerRequest}$ [kW] can be represented by Eq. (3):

$$MTR_{PowerRequest} = \frac{2\pi N_{Mtr} T_{Request}}{60} + MTR_{PowerLossR} \text{ [kW]}. \tag{3}$$

Next, description is made of a method of calculating a vehicle request power in step S24.

Supposing that a battery charging power is described as $BATT_{in}$ [kW]; and a power consumption of the vehicle accessories 23 PAUX [kW], a vehicle request power $V_{RequestPower}$ [kW] demanded for a whole of a fuel cell powered vehicle can be represented by Eq. (4):

$$V_{RequestPower} = BATT_{in} + PAUX + MTR_{PowerRequest} \text{ [kW]}. \tag{4}$$

Now, description is made of a method of calculating a fuel-cell request power in step S25.

Suppose a discharging power (battery assist power) of the battery 21 is described as $BATT_{out}$ [kW], a target request power of $V_{TargetRequestPower}$ [kW] demanded to the fuel cell 1 can be represented by Eq. (5):

$$V_{TargetRequestPower} = V_{RequestPower} - BATT_{out} \text{ [kW]}. \tag{5}$$

Also, the battery assist power can be calculated based on detected values of the current sensor 33 and the voltage sensor 34.

Figure 13:
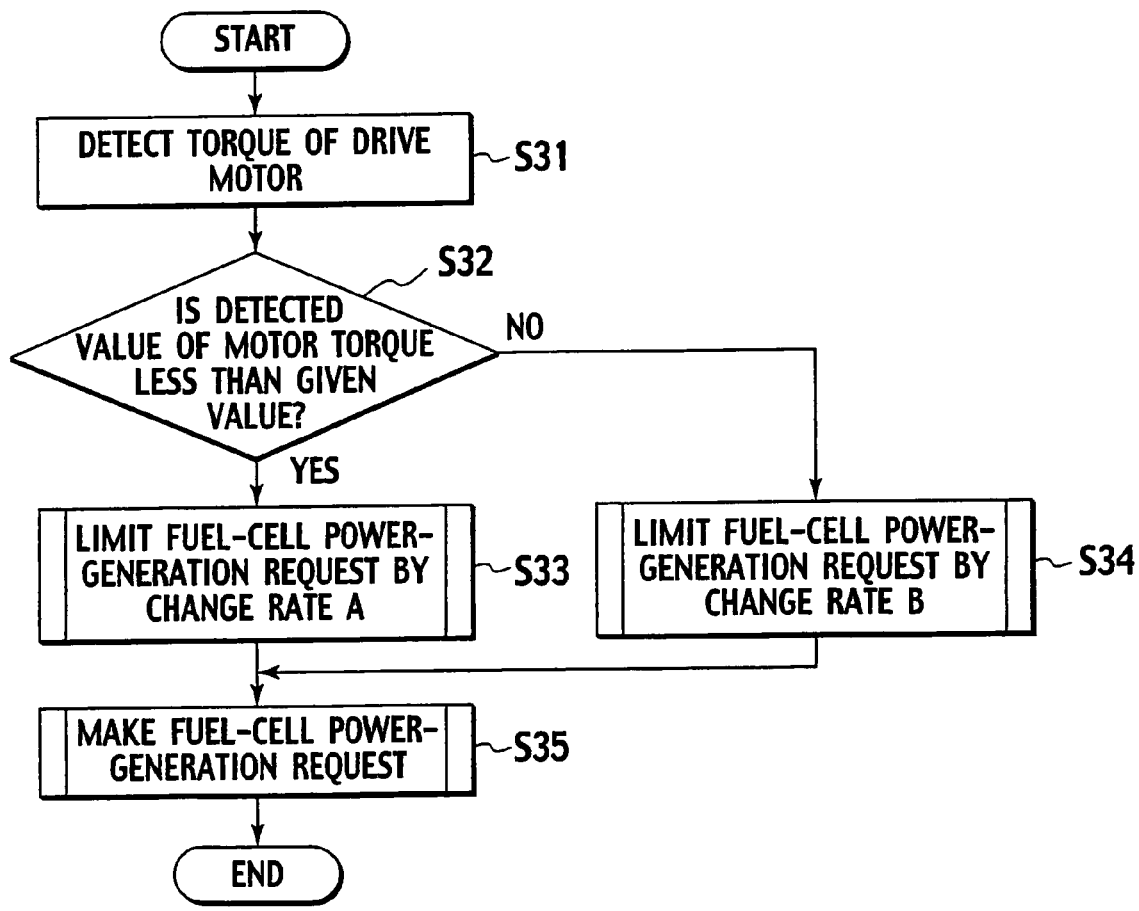
FIG. 13 is a flowchart showing a detailed sequence of operations of restricting a rate of change in a power generation request power demanded to the fuel cell.

Next, reference is made to a flowchart of FIG. 13 for describing details of the operations in step S26, that is, a basic sequence of operations of the system controller 100 when making a power-generation request to the fuel cell 1. As set forth above, the system controller 100 makes the power-generation request to the fuel cell 1 in step S26 based on the fuel-cell request power, calculated in step S25, in the control flow shown in FIG. 11. In this moment, the operation is executed to limit a change of rate in the request power in a way not to cause a remarkable delay in response due to a rapid change in the request power. In addition, especially with the presently filed embodiment, under circumstances where the torque of the drive motor 22 is less than a given value, alleviating the limitation in the rate of change in the request power allows the power request to be made to the fuel cell 1 under the optimum condition depending on operating conditions (a vehicle speed of a fuel cell powered vehicle) of the drive motor 22, thereby effectively enabling the prevention of the battery 21 from discharging in excess. Thus, step S26 serves as a request-power change-rate restriction device.

That is, when making the power-generation request to the fuel cell 1, first in step S31, the system controller 100 detects the torque of the drive motor 22 based on information from the motor inverter 26. In succeeding step S32, discrimination is made whether the torque of the drive motor 22, detected in step S31, is less than the given value.

Here, if the torque of the drive motor 22, detected in step S31, is less than a given value, then in step S33, the operation is executed to limit the rate of change in a power-generation target value of $V_{TargetRequestPower}$ [kW] demanded to the fuel cell 1, calculated in step S25, in the control flow shown in FIG. 11, in terms of the rate of change in an upper limit value of A [kW/sec]. In contrast, if the torque of the drive motor 22, detected in step S31, exceeds the given value, then in step S34, the rate of change in the power-generation target value of $V_{TargetRequestPower}$ [kW] demanded to the fuel cell 1, in terms of a certain rate of change in an upper limit value B [kW/sec] that is smaller than the rate of change in the upper limit value A. In succeeding step S35, a power-generation request is made to the fuel cell 1 depending on the target value of the fuel-cell request power whose rate of change is limited in a manner set forth above.

As previously described, when controlling the rate of change in the request power demanded to the fuel cell 1, the limitation in the rate of change in the fuel-cell request power is alleviated under conditions where the torque of the drive motor 22 is less than the given value. Thus, it becomes possible to effectively prevent the battery 21 from discharging in excess that could be concerned in the presence of excessive degree of limitation made in the rate of change in the fuel-cell request power demanded to the fuel cell 1.

With the control device of the fuel cell powered vehicle according to the present invention, even in cases where upon detection of the atmospheric pressure, a fuel-cell power-generation response time is estimated to be longer than that obtained during normal operation due to a drop in an air density and a drive torque command value with respect to the drive motor is predicted to be limited by the electric power and cannot be commanded as targeted, the motor-output response control means controls the output response time of the drive motor, thereby making it possible to alleviate a sense of discomfort in acceleration feelings encountered by rapid power limitation.

The entire content of Japanese Patent Application No. P2004-064383 with a filing data of Mar. 8, 2004 is herein incorporated by reference.

Although the present invention has been described above by reference to certain embodiments of the invention, the invention is not limited to the embodiments described above and modifications will occur to those skilled in the art, in light of the teachings. The scope of the invention is defined with reference to the following claims.

What is claimed is:

1. A control device for an electric power supply system of a fuel cell powered vehicle, driven by a drive motor, which is installed with a fuel cell as a main power supply, comprising:
   a fuel-cell power-generation response time estimating section by which a power-generation response time of the fuel cell is estimated; and
   a drive-motor output response-time control section by which an output response time of the drive motor is controlled depending on an estimated result of the fuel-cell power-generating response-time estimating section.

2. The control device for a fuel cell powered vehicle according to claim 1, wherein
   when the power-generation response time of the fuel cell is estimated to be longer than that obtained in normal time and a drive torque command value for the drive motor is predicted to be restricted by an electric power, the drive-motor output response-time control section controls an output response time of the drive motor.

3. The control device for a fuel cell powered vehicle according to claim 1, wherein
   the fuel-cell power-generation response time estimating section estimates a power-generation response time based on an atmospheric pressure detected by an atmospheric sensor.

4. The control device for a fuel cell powered vehicle according to claim 1, wherein
   the drive-motor output response-time control section comprises:
   a drive-motor upper-limit torque calculation device that calculates an upper limit based on a rotational speed of the drive motor,
   a drive-motor power-loss estimation device that estimates a power loss based on the rotational speed and the upper limit torque of the drive motor,
   a drive-motor maximum power consumption calculation device that, in a case where it is predicted that an output of the drive motor exceeds an electric power available to be supplied to the drive motor, calculates a maximum power consumption of the drive motor based on the rotational speed and the upper limit torque of the drive motor, and
   a drive-motor output response estimation device that estimates an output response of the drive motor based on a calculated result of the drive-motor maximum power consumption calculation device,
   wherein in a case where the output of the drive motor is estimated to exceed the electric power available to be supplied to the drive motor, an output response time of the drive motor is corrected in a way to increase.

5. The control device for a fuel cell powered vehicle according to claim 4, wherein
   the drive-motor output response-time control section corrects an output response time of the drive motor such that the output response time of the drive motor is substantially aligned with an output response time of the fuel cell.

6. The control device for a fuel cell powered vehicle according to claim 4, wherein
   the drive-motor output response-time control section corrects an output response time of the drive motor by decreasing a rate of change in a torque command value for the drive motor.

7. The control device for a fuel cell powered vehicle according to claim 4, wherein
   the fuel cell powered vehicle is installed with a battery as an auxiliary power supply, and
   the drive-motor output response-time control section further comprises:
   a battery maximum-discharging-power calculation section that calculates a maximum discharging power of the battery based on information from a battery controller that manages a charging status of the battery and an output current and an output voltage of the battery; and
   a vehicle-accessory power-consumption estimation device that estimates electric power consumed by vehicle accessories;
   wherein an estimated result of the vehicle-accessory power consumption estimation device is subtracted from a value of a sum of a maximum electric power available to be supplied from the fuel cell and an estimated result of the battery maximum-discharging-power estimation section for calculating the maximum electric power to be supplied to the drive motor.

8. The control device for a fuel cell powered vehicle according to claim 7, wherein
   the vehicle-accessory power consumption estimation device calculates an upper limit of a power consumption of the vehicle accessories based on an estimated result of the fuel-cell power-generation response time estimating section for estimating that the power consumption of the vehicle accessories lies at a value below the upper limit value.

9. The control device for a fuel cell powered vehicle according to claim 1, further comprising:
   a request-power change-rate restriction device;
   wherein the request-power change-rate restriction device alleviates a restriction in a rate of change in a request power for the fuel cell when a torque of the drive motor is less than a given value.

10. A control device for an electric power supply system of a fuel cell powered vehicle, driven by a drive motor, which is installed with a fuel cell as a main power supply, comprising:

means for estimating a fuel-cell power-generation response time of the fuel cell; and means for controlling an output response time of the drive motor depending on an estimated result of the means for estimating the fuel-cell power-generating response-time.

11. A method of controlling an electric power supply system of a fuel cell powered vehicle, driven by a drive motor, which is installed with a fuel cell as a main power supply, comprising:

estimating a power-generation response time of the fuel cell; and controlling an output response time of the drive motor depending on an estimated result of the estimating.

* * * * *